2 Sheets--Sheet 1.
A. K. RIDER,
Assignor, by mesne assignments, to C. H. DELAMATER & T. J. RIDER.
Hot Air Engine.
No. 9,359. Reissued Aug. 31, 1880.
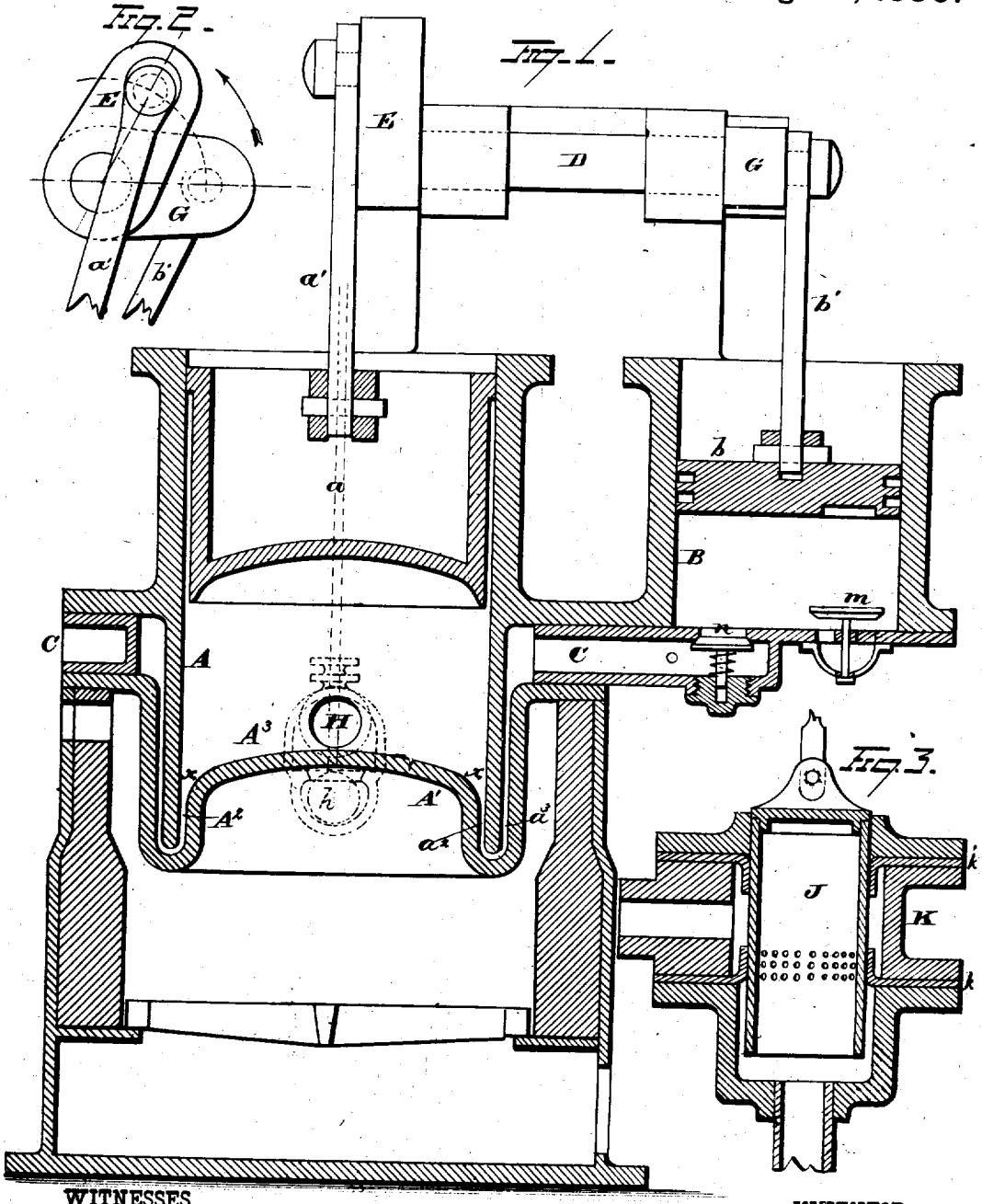
WITNESSES
E. Nottingham
A. L. Lawrence.
INVENTOR
A. K. Rider.
By H. A. Symon.
ATTORNEY 2 Sheets—Sheet 2.
A. K. RIDER,
Assignor, by mesne assignments, to C. H. DELAMATER & T. J. RIDER.
Hot Air Engine.
No. 9,359. Reissued Aug. 31, 1880.
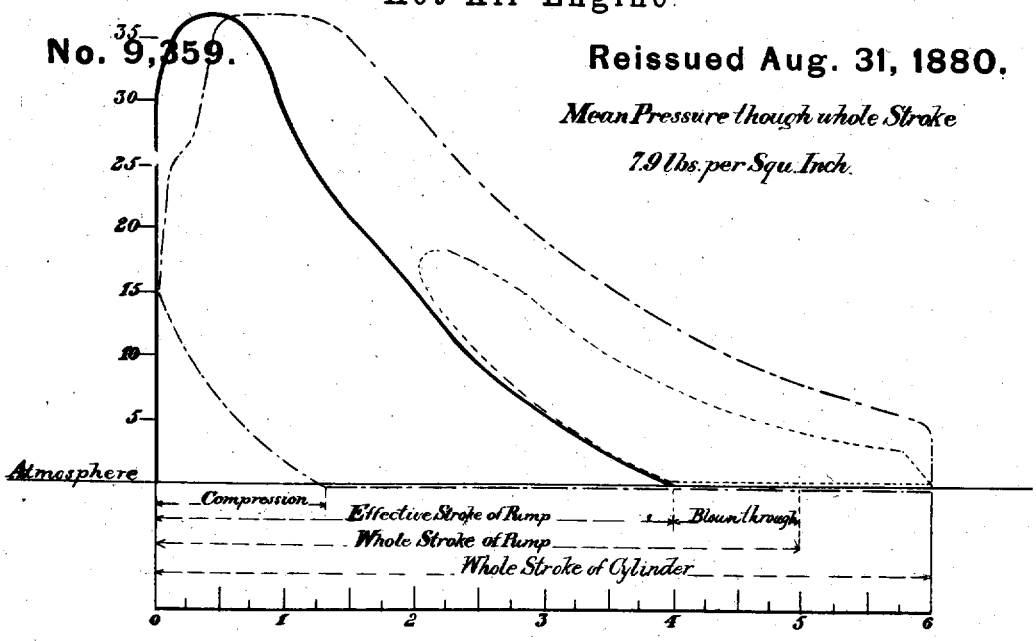
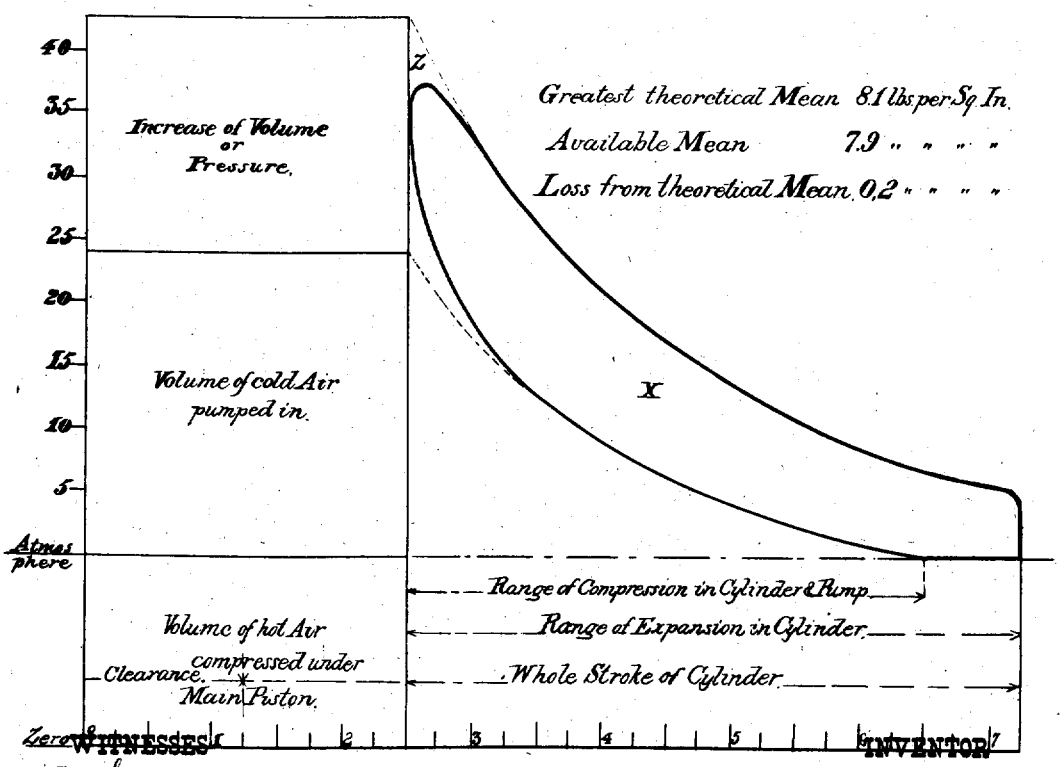
WITNESSES
E. Nottingham
A. L. Lawrence.
INVENTOR
A. K. Rider.
By H. A. Seymour,
ATTORNEY

UNITED STATES PATENT OFFICE.

ALEXANDER K. RIDER, OF WALDEN, NEW YORK, ASSIGNOR, BY MESNE ASSIGNMENTS, TO CORNELIUS H. DELAMATER AND THOMAS J. RIDER, OF NEW YORK CITY.

HOT-AIR ENGINE.

SPECIFICATION forming part of Reissued Letters Patent No. 9,359, dated August 31, 1880.

Original No. 128,979, dated July 16, 1872; Reissue No. 5,340, dated March 25, 1873. Application for reissue filed July 19, 1880.

*To all whom it may concern:*

Be it known that I, ALEXANDER K. RIDER, of Walden, in the State of New York, have invented an Improvement in Hot-Air Engines, of which the following is a specification.

The invention relates to an improvement in hot-air engines, the object being to provide an engine of such construction and relative arrangement of parts that the supply of air will be compressed in one cylinder, and from thence be transferred to a heater and expanded therein, and caused to impart motion through a single-acting power-piston directly to a crank or the main shaft, with which is connected the compression-piston.

With this end in view my invention consists in an air-engine consisting, essentially, of a single-acting compression-piston and a single-acting power-piston connected directly to cranks on the main shaft arranged at right angles, or nearly so, to each other, the parts being so arranged that air will be compressed by the compression-piston, and the compressed charge be then transferred to a heater connected with the lower portion of the power-cylinder and therein expanded, causing it to exert its force against the power-piston, and thereby actuate the main shaft of the engine.

My invention further consists in a governor-valve provided with perforations and packings, constructed and arranged to overrun said perforations in the operation of the valve.

The accompanying drawings form a part of this specification.

Figure 1 is a central vertical section of so much of a complete engine as is required to show the novelty and to indicate the relation of the novel parts to the other parts. Fig. 2 is a view of a small portion at right angles to the view in Fig. 1; and Fig. 3 is a section, showing a detail on a large scale.

Similar letters of reference denote corresponding parts in all the figures.

A designates the power-cylinder, and A′ a heater which is located below the power-cylinder.

The lower end of heater A′ is constructed with an annular air-heating chamber, $A^2$, which extends entirely around and below the inner bottom, $A^3$, of the heater.

To the power-cylinder is connected, by a close joint, a depending shield or tube, $x$, which extends downwardly into the annular air-heating chamber $A^2$ of the heater, thereby forming the narrow air-passages $a^2$ $a^3$ between the walls of the heater and the opposite sides of the shield or tube $x$.

A casting or waist-piece, C, is interposed between the power-cylinder and heater, and forms an annular air-conduit, extending entirely around the shield or tube $x$, by means of which the compressed air from the compression-cylinder is evenly distributed to the entire circumference of the heater, and is caused to flow downwardly through the narrow air-passage $a^3$, formed between the heater and outer surface of the shield or tube $x$, and beneath the lower edge of the tube or shield, and then upwardly through the narrow air-passage $a^3$ into the interior of the heater and below the power-piston.

The compression-piston $b$ is jointed to a rod, $b'$, and the power-piston $a$ is jointed to a rod, $a'$. Both rods $b'$ and $a'$ are connected, respectively, to cranks G E on the main shaft D, which latter is supported above said pistons in suitable bearings.

Cranks E G stand nearly at a right angle to each other, though when the usual amount of clearance obtains—say about one-fifth the capacity of the power-cylinder—they are arranged so as to form an angle of about seventy degrees; but the angle varies to some extent with the increase or decrease of the clearance—the greater the clearance the lower the angle.

The motion is in the direction of the arrow in Fig. 2, the power-crank being ahead of the other. The valves $m$ $n$ in the base of the compression-cylinder B are self-acting. The air is inducted through the valve $m$ on the ascent of the compression-piston $b$, and is discharged through the valve $n$ during the descent thereof.

H is the exhaust-passage, which it will be understood is controlled by a valve, $h$, of ordinary construction. (Represented in dotted lines.) This valve is operated by a cam or analogous device through suitable connections.

When the power-piston *a* has ascended nearly to its highest elevation the exhaust-valve *h* opens, and the piston, on descending again, meets no resistance until it has arrived at a certain point in its downward stroke, when the exhaust-valve closes. In the meantime the compression-piston *b* has completed its upstroke, thereby filling the compression-cylinder B with cold air, and has commenced to descend and force the same through the delivery-valve *n*, and through the passage in the waist-casting C into the bottom of the power-cylinder. This action has an important influence on the success of my machine, for, as the cold air thus driven through the passages requires an appreciable time to raise its temperature, it, by being delivered thus uniformly at a low temperature all around the power-cylinder, drives before it the hot air with which the spaces were previously filled, and at the moment of the closing of the exhaust-valve *h* there is an active current of air outward through the exhaust-passage, due to the fact that the descending motion of the compression-piston *b* has progressed one-fifth of its stroke downward, and that the cold air is being driven thereby into and through the working-cylinder. On the closing of the exhaust-valve *h* the continued descent both of the power-piston *a* and of the compression-piston *b* compresses the air under both to a nearly equal extent. It follows that there is for a short period no motion of the air through the interior of the waist-piece C, but simply an increase of density and pressure. This condition obtains until the power-piston *a* commences to rise. This motion, being followed up by the about equal descent of the compression-piston, causes a rapid and complete transfer of all the cold and compressed air into the heater without material change of volume. The result is immediate augmentation of pressure, and afterward, as the power-piston moves upward, increase of bulk or volume. Thus the greatest possible result is obtained in the amount of power developed. This transfer is accomplished without any considerable change of volume. It is a rapid transference of the cold compressed air in its compressed condition from the compressing-cylinder into and through the heater, and the upward motion of the main piston being so closely followed up by the downstroke of the compression-piston, the air is not allowed to increase its bulk till it is nearly all thoroughly heated, and thus the greatest possible power within the limits of temperature and compression is secured. The tube or shield *x* is merely an extension of the working-cylinder, and its use is to compel a close contact of the inflowing air with the hottest portion of the heater.

I attach much importance to the ratio of the entire clearance-space to the amount of air compressed by the power-piston in its descent. This ratio should be so proportioned that the volume of spent hot air arrested in its outflow by the early closure of the exhaust would reach a tension fully equal to that in the compression-cylinder, in order that the cold air compressed by the descent of the compression-piston shall remain where compressed until the proper time for its transference into the heater. If the air is allowed to pass into the heater during its compression it takes more power to compress it. I avoid this loss of effect by compressing just sufficient of the previously hot air to keep the cool back until the compression is nearly or quite complete. The regulation is effected by a fly-ball or other ordinary governor (not represented) acting upon tube J, placed between cup-leather packings *k k'* in a casing, K, which communicates with the interior of the waist-piece C.

When the work requires all the power of the engine the tube J stands low and discharges no air. As the speed increases the tube J is drawn upward, and when much too great it allows a large quantity of air to escape through minute perforations arranged around the lower portion of the tube J. These apertures should be small and the exterior of the tube J at that point made smooth, so that it will run freely past the cup-leather *k*. This "regulator-valve," as I will term it, works without appreciable friction, and may be of such size as to control the speed very efficiently under all ordinary conditions. I can effect the same object to some extent by a throttle-valve in the passage C, connecting the supply and main cylinders, said valve being, of course, attached to the governor; but I prefer the plan first described.

The shaft D may be mounted below and connected by beams or links, the angles of the cranks being preserved; but I prefer the direct connection, as shown.

The cards or diagrams on Sheet 2 will be understood with a brief explanation. The uppermost shows two cards superposed one upon the other. The strong line is the pump-card, and shows the power consumed in the action to keep the air supplied properly by the pump. The extremity at and near the right is blank, or the pencil returns on the same line as it goes out, because the exhaust-valve *h* is wide open. The heavy dotted line is the power-cylinder card.

The effective power of the engine is the area remaining after the pump-card is deducted from the other. The fine series of dots shows the card of an engine of equal capacity on the ordinary plan, or more specially on the plan which I esteem the best next to this, and which is set forth in the patent issued to me dated October 24, 1871, No. 120,325.

The card near the bottom of Sheet 2 is a diagram of the total work of compression done by both pistons, and also shows the greatest possible power which this quantity of air under the assumed conditions of compression and temperature is capable of producing—that is, the whole effect due to heat and pressure. This diagram also shows the portion of this whole effect which this engine utilizes. The interior and rounded portion (marked X) represents the power obtained, and the vacant corners Y and Z represent the loss from the full theoretic effect. The increase of volume due to the temperature is taken at 0.78. The full theoretic pressure which the assumed quantity of air and other conditions give is equal to an average of 8.1 pounds per square inch throughout the stroke, and the mean pressure actually utilized is 7.9 pounds per square inch. The difference (only 0.2 pound per square inch) is the amount of loss from the full theoretical effect.

Having fully described my invention, what I claim as new, and desire to secure by Letters Patent, is—

1. An air-engine consisting, essentially, of single-acting compression and power pistons directly connected to cranks on the main shaft, the parts being so arranged that air will be compressed by the downstroke of the compression-piston and the compressed air transferred from the lower end of the compression-cylinder directly to a heater connected with the lower portion of the power-cylinder, and therein expanded and caused to move the power-piston through its upstroke, substantially as set forth.

2. In an air-engine, a power-cylinder having a heater connected with the lower portion thereof, and an air-conduit located above the heater and adapted to receive the charge of compressed air from the lower end of the compression-cylinder and convey it directly to the heater, substantially as set forth.

3. In an air-engine, a power-cylinder having a heater connected with the lower portion thereof and a shield or tube extending down into said heater, forming an annular air-space between the heater and shield, and an air-conduit located above the heater and communicating with a separate and independent compression-cylinder, substantially as set forth.

4. In an air-engine, the combination, with separate and independent power cylinder and piston and compression cylinder and piston, of a heater connected with the lower portion of the power-cylinder, a shield or tube extending down into said heater, and an air-passage leading from the compression-cylinder to the power-cylinder at a point above the lower limit of the stroke of the power-piston, substantially as set forth.

5. In an air-engine, a power-cylinder having a heater connected with the lower portion thereof and a shield or tube extending from the power-cylinder downwardly into said heater, the parts being constructed to form an annular air-chamber above the heater for the reception of the air from the compression-cylinder, substantially as set forth.

6. In an air-engine, the combination, with a compression cylinder and piston, of a power-cylinder provided with a heater and deflecting shield or tube, the parts being constructed and arranged so that air from the compression-cylinder will be caused to flow downwardly in direct contact with the heater and then upwardly into the same, substantially as set forth.

7. A governor-valve provided with perforations and packings constructed and arranged to overrun said perforations in the operation of the valve, substantially as set forth.

In testimony whereof I have hereunto set my hand in the presence of two subscribing witnesses.

ALEXANDER K. RIDER.

In presence of—
W. G. RUTHERFORD,
C. W. SADLIER.